March 1, 1955 W. A. GEBHARDT ET AL 2,703,223
COOLER FOR REFRIGERATORS
Filed March 10, 1954 2 Sheets-Sheet 1

INVENTORS
WILLARD A. GEBHARDT
EDWIN J. RADTKE
BY
Young Wright
ATTORNEYS

March 1, 1955

W. A. GEBHARDT ET AL 2,703,223

COOLER FOR REFRIGERATORS

Filed March 10, 1954

INVENTORS
WILLARD A. GEBHARDT
EDWIN J. RADTKE

BY

*Young and Wright*

ATTORNEYS 2,703,223
COOLER FOR REFRIGERATORS

Willard A. Gebhardt and Edwin J. Radtke,
Milwaukee, Wis.

Application March 10, 1954, Serial No. 415,244

3 Claims. (Cl. 257—9)

This invention appertains broadly to refrigeration, and more particularly to a novel air conditioning unit for use in meat coolers, chill and boning rooms, etc., and is an improvement on our Patent No. 2,132,985 issued October 11, 1938.

One of the primary objects of our present invention, is to provide novel means for insuring a uniform and full volume of air flow past the cooling units throughout the entire length of the refrigerating unit, whereby to insure the proper distribution of cool air at a desired uniform temperature into the room.

Another salient object of the invention is to provide an air conditioning unit including an elongated body housing or shell divided into a lower air pressure chamber and an upper air flow and distributing chamber by a novelly disposed perforated baffle plate, with means including a motor driven blower for supplying air at the desired volume rate of flow to one end of the air pressure chamber, the baffle plate being so formed and arranged that the flow of air therethrough will be equal from the blower to the opposite end of the unit without objectionable air eddies and dead spots.

A further object of the invention is to permit the unobstructed flow of air from the blower to the air pressure chamber and to dispose the air equalizing baffle plate at an angle to the horizontal and at a gradual incline downward from the blower to the opposite end of the unit, so that the incoming air will impinge against the lower surface of the baffle and be directed through the openings thereof, and whereby the air will be gradually restricted at the far end of the pressure chamber from the blower to insure the flow of air through the baffle plate equally, from one end thereof to the other.

A further important object of the invention is to utilize the baffle plate as a water (condensation) flow plate, so as to insure the washing and humidifying of the air as the same passes through the openings in the baffle plate and thereby effectively preserve the color of the meat and to prevent excessive shrinkage in the meat.

Another further object of our invention, is to provide imperforate baffle plates on the opposite sides of the cooling coils in spaced relation to the side walls of the body housing and extending above the side walls, whereby to prevent the formation of ice and condensation on the side walls and to direct the cool air out above the side walls.

A still further object of the invention is to provide a top wall for the unit for directing the air outward in the nature of a pan for collecting water of condensation and to provide side inclined baffle plates in connection therewith for either directing the cold humidified air up or down as may be desired in a particular installation.

Another still further important object of the invention is the provision of electric heater means associated with the unit at predetermined points, adapted to be brought into use at desired times for humidity control.

With these and other objects in view the invention consists in the novel construction, arrangement and formation of parts as will be hereinafter more specifically described and claimed, and illustrated in the accompanying drawings, in which drawings, Figure 1 is a longitudinal sectional view through our improved cooler for refrigerating and like rooms, the section being taken on the line 1—1 of Figure 2, looking in the direction of the arrows;

Figures 1, 2:
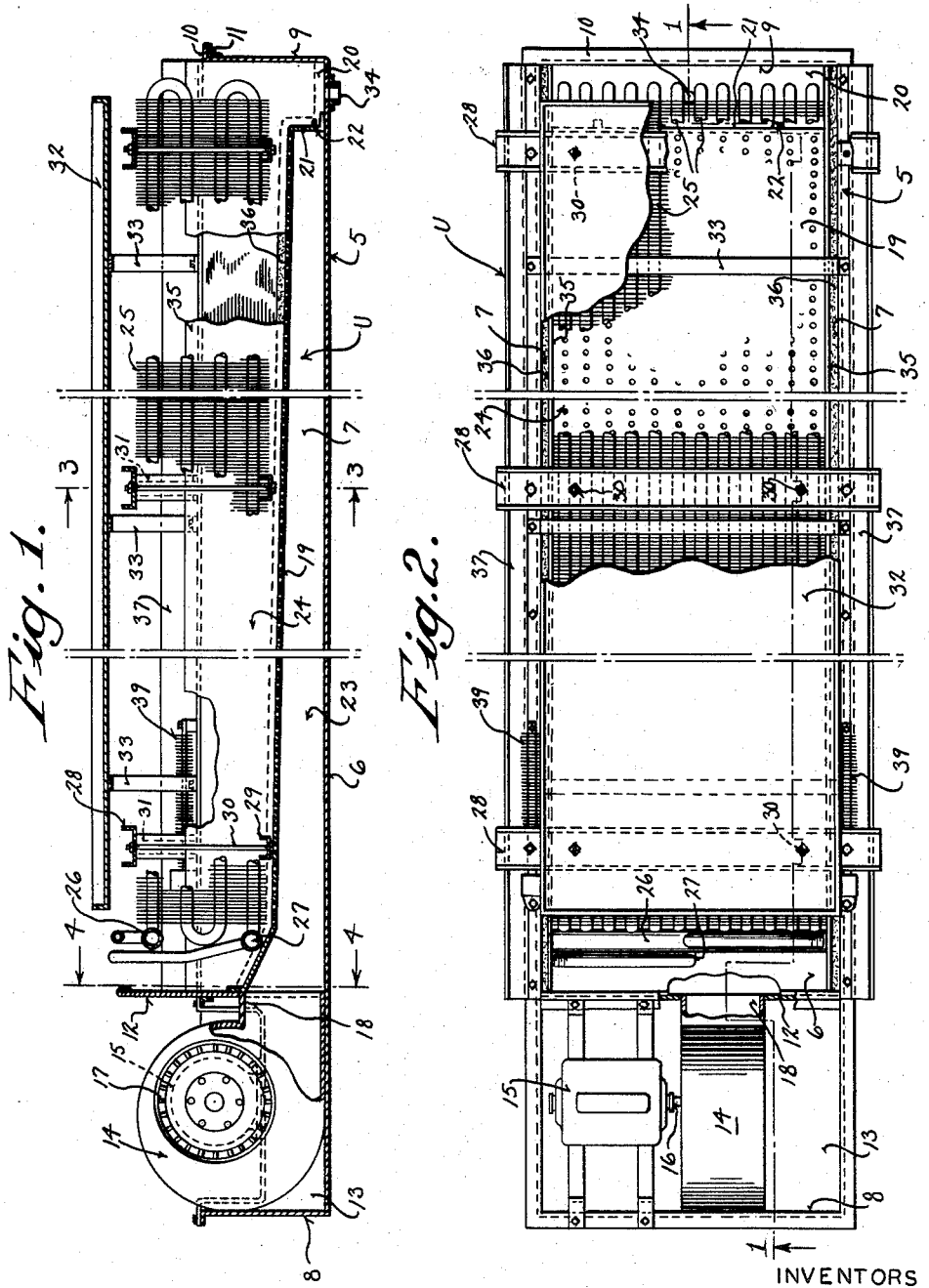
Figure 2 is a top plan view of our unit, parts of the view being shown broken away to illustrate structural detail.

Referring to the drawings in detail, wherein similar reference characters designate corresponding parts throughout the several views, the letter U generally indicates the complete unit and the same includes an outer body housing or shell 5, preferably formed from metal, such as stainless steel, which will resist rust. This body housing includes a bottom wall 6, spaced parallel side walls 7, and end walls 8 and 9. The upper edges of the walls 7, 8 and 9 are provided with outwardly extending marginal flanges 10 to reinforce and strengthen the housing and to provide attaching means for certain parts of the unit as will be later brought out. If desired angle iron frame members 11 can be secured to the walls 7 and 9 under the flanges 10 to add additional strength and rigidity to the unit.

Arranged within the body housing adjacent to the end wall 8 is a transverse partition 12, which preferably extends above the side walls 7, and this partition in conjunction with the end wall 8 forms a compartment 13. Arranged within the compartment 13 is the blower 14 and its electric drive motor 15. The armature shaft 16 of the motor is directly connected to the shaft of the fan 17 of the blower. In accordance with our improvements, the outlet throat 18 of the blower opens out straight through the partition plate 12, for a purpose which will also later appear and it is to be noted that this throat is unobstructed.

Arranged within the body housing 5 is a perforated air equalizing baffle plate 19. This baffle plate extends from one side wall 7 to the other and is rigidly secured to these walls by welding or the like, and the plate can be formed from stainless steel, if so desired. As best shown in Figure 1, the baffle plate extends from the partition wall 12 toward the end wall 9 and the baffle plate terminates slightly short of this end wall 9 to provide a drain sink 20. The plate 19 has its end just adjacent to the wall 9 bent down into engagement with the bottom wall 6 of the body housing to form an end wall 21, and this end wall is provided with drain openings 22 which communicate with the drain sink 20. The end of the wall 19, which is adjacent to the partition wall 12, is bent up and secured to this partition directly above the outlet throat 18 of the blower. The arrangement of the baffle plate 19 is such as to form a lower pressure chamber 23 and an upper air flow and distributing chamber 24. One of the important features of the present invention, is the fact that we incline the baffle plate 19 downwardly from the blower toward the end wall 9, and this feature will be later discussed.

Arranged within the upper air flow and distributing chamber 24 are the finned cooling coils 25, and these coils extend from one end of the chamber to the other. The coils are provided with inlet and outlet headers 26 and 27 with which inlet and outlet pipes communicate for permitting the circulation of the refrigerating liquid through the coils. The cooling coils are arranged above the perforated equalizing baffle 19 and the coils extend the full length of this plate. The cooling coils 25 can be held in the chamber 24 in any desired manner, and in the present showing upper and lower channel clamp bars 28 and 29 are provided, and these bars are held together on the coils by vertical tie rods 30. The top channel bars 28 constitute the supporting means for the cooling coils and these bars extend beyond the walls 7 of the body housing 5 and are secured to the side walls by brackets 31. These brackets are bolted or otherwise secured to the flanges 10 on the side walls 7.

Forming the top of the unit is a top wall deflector plate 32 and this plate can be in the nature of a pan for the collection of water of condensation. The deflection plate is held in proper spaced relation to the coils 25 and the side walls 7 by means of inverted U-shaped brackets 33, which extend transversely across the unit with the lower ends thereof secured to the flanges 11 of the side walls.

In use of the unit, the same is secured in place at the proper point to the ceiling of a chill or cold room, by suspension hangers (not shown), and as condensation collects in the unit, the same drips from the coils onto the baffle plate 19. Air flowing through the openings in the baffle plate 19 from the pressure chamber 23 into the chamber 24 is washed and humidified by the water. Surplus water flows down the inclined baffle plate 19 into the sink 20, and a drain pipe 34 can be provided for carrying this surplus water off to a sewer. If desired, an additional drain pipe (not shown) can be provided for the chamber 23 adjacent to the wall 21.

In conjunction with the top deflector plate 32 we utilize side wall deflector or baffle plates 35. These side wall deflector or baffle plates 35 are secured to the upper surface of the baffle plate 19 and extend from the partition 12 to the end wall 9 in slightly spaced relation to the side walls 7 of the body housing. Combination insulator and spacer strips 36 are disposed between the lower ends of the deflector or side baffle plates 35 and the upper end of the baffle plates extend above the upper edges of the walls of the body housing. The side plates 35 not only direct the air upwardly and then outwardly, but also form a space between the chamber 24 and the side walls 7 to prevent the frosting up of these side walls 7 and the accumulation of moisture thereon.

Figure 3:
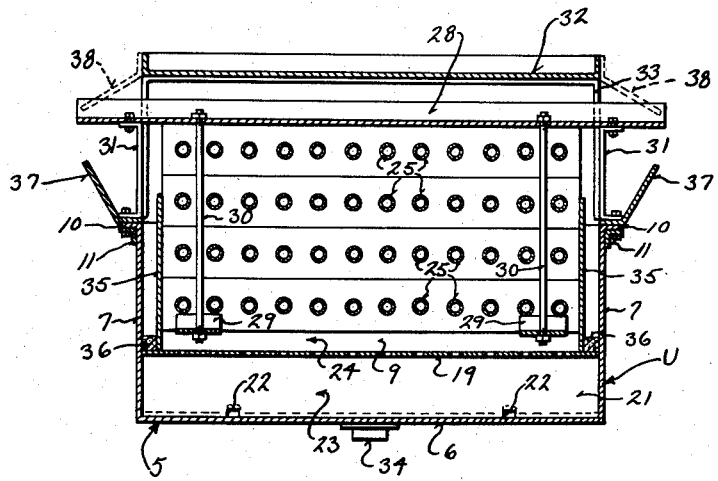
Figure 3 is a transverse sectional view through the unit taken on the line 3—3 of Figure 1, looking in the direction of the arrows and showing the arrangement of the cooler units and side baffle plates.
Figure 4:
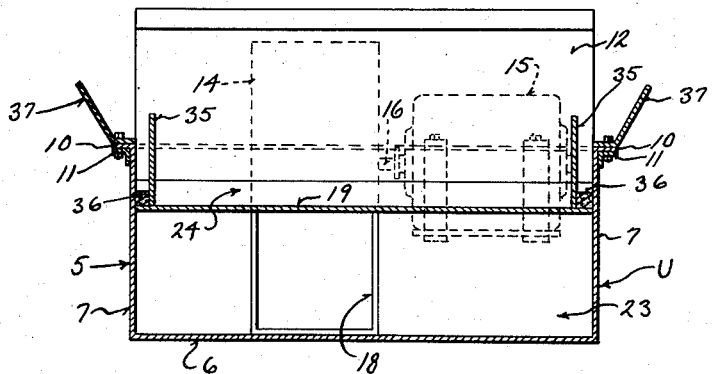
Figure 4 is a view similar to Figure 3, but taken on the line 4—4 of Figure 1, the view showing the unobstructed inlet for the air leading into the pressure chamber from the blower.

Longitudinally extending outwardly angled louvers 37 are also provided, and as shown in Figures 3 and 4, these louvers are directed upwardly and outwardly and are secured to the flanges 10 on the side walls 7. These louvers are used to direct the air upwardly and against the ceiling of a room where it is again distributed and deflected downwardly. If so desired, and as suggested in dotted lines in Figure 3, "down" louvers 38 can be provided and these louvers can be carried by the longitudinal side edges of the top deflector plate 32. In this instance, the louvers 38 direct the air downward.

Now considering that the unit is properly positioned in the room with the blower 14 functioning; then the air from the blower enters straight into the pressure chamber 23 and due to the inclination of the baffle plate 19, the air strikes the lower surface of the baffle plate and is directed through the openings into the baffle plate, into the chamber 24 past the coils 25 and out of the sides of the unit. As the chamber 23 decreases in size toward the end wall 9, the air is gradually restricted as the same flows toward the end wall 9, and this restriction eliminates undesired air eddies and dead spots, and insures the upward flow of the air through the perforations and actually the flow of air is equal throughout the entire length of the baffle plate 19.

Electric heating elements 39 of a desired type can be placed on opposite sides of the unit in the air stream to regulate humidity and these heaters can be turned off and on as desired. The heaters can be bolted or otherwise fastened to the flanges 10 of the side walls 7. The heating elements 39 are of great importance, in that under certain conditions an excessive amount of moisture is present in the air. By utilizing the heaters, the air is somewhat dried and lightened to permit the free circulation thereof and the depositing of the moisture on the cooling coils.

Changes in details may be made without departing from the spirit or the scope of this invention, but what is claimed as new is:

1. An air conditioning and cooling unit for chill and like rooms comprising an elongated body housing having a bottom wall, spaced parallel side walls and end walls, a transverse partition in said body housing arranged adjacent to one end wall, an air equalizing and distributing baffle plate disposed in the housing extending from one side wall to the other and from the partition toward the remote end wall defining in said housing a lower pressure chamber and an upper air distributing chamber, said baffle plate being provided with perforations, a motor driven blower in said housing on the opposite side of the partition from the baffle plate having a straight outlet throat opening into the pressure chamber, said baffle plate also including an end wall engaging the bottom wall of the housing in spaced relation to an adjacent end wall and defining a water collection sink, a discharge pipe communicating with the sink, cooling coils within the upper chamber, a top deflector plate carried by the housing in spaced relation to the upper edges of the side walls and disposed above the cooling coils, and outwardly angled baffle plates disposed on opposite sides of the housing and cooling coils.

2. An air conditioning and cooling unit as defined in claim 1, and said air distributing baffle plate being inclined downwardly from the partition plate toward the opposite end of the housing.

3. An air conditioning and cooling unit as defined in claim 1, and electric heaters disposed between the top plate and the sides of the housing.

References Cited in the file of this patent

UNITED STATES PATENTS

| | | |
|---|---|---|
| 2,012,559 | Friedrich | Aug. 27, 1935 |
| 2,132,985 | Gebhardt et al. | Oct. 11, 1938 |
| 2,306,969 | MacMasters | Dec. 29, 1942 |
| 2,552,396 | Brandecker | May 8, 1951 |